Dec. 24, 1940.  C. BORGWARD  2,226,047
REAR AXLE DRIVE AND SUSPENSION MEANS
Filed Aug. 3, 1939  2 Sheets-Sheet 1
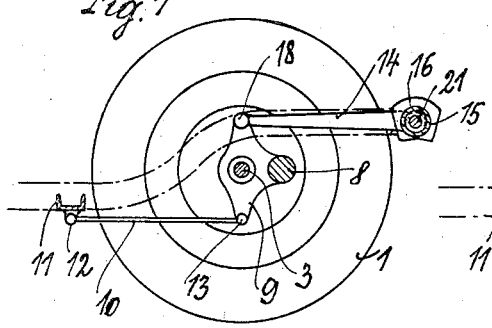
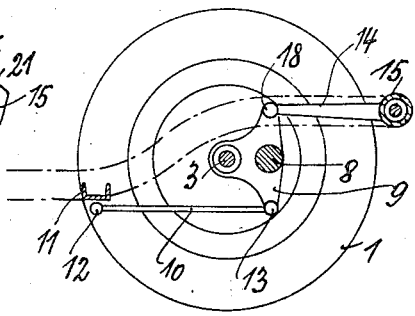
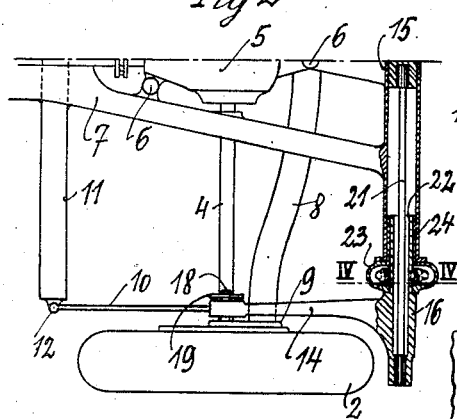
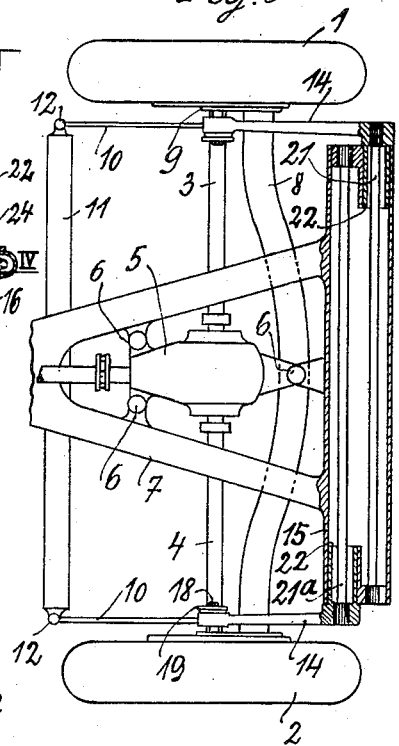
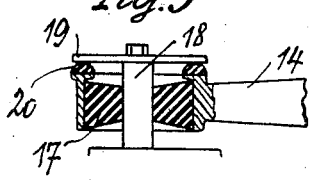
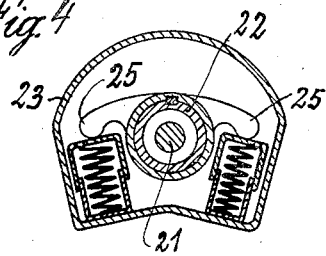
Inventor:
Carl Borgward,
by Frank S Appleman,
attorney.

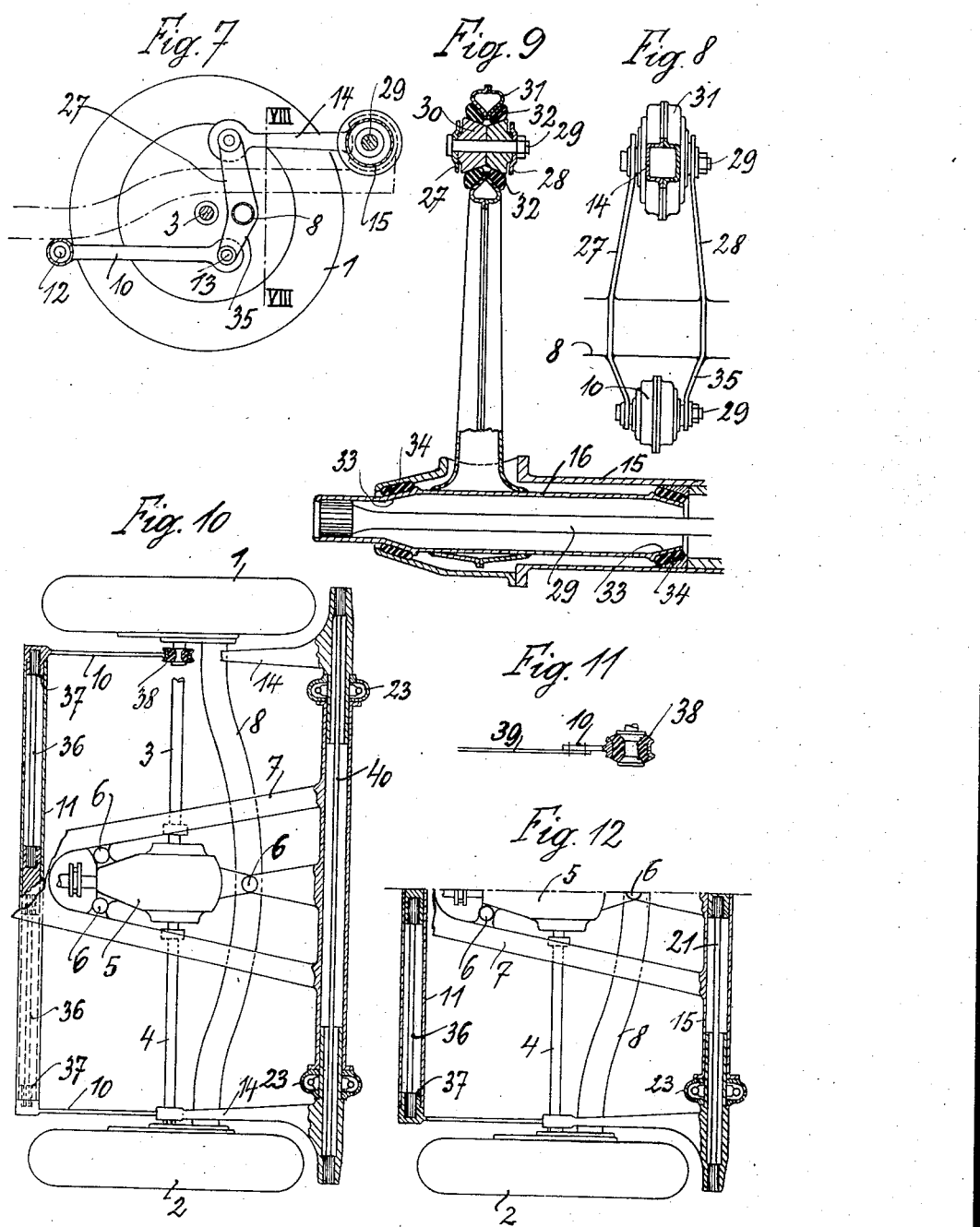

Patented Dec. 24, 1940

2,226,047

UNITED STATES PATENT OFFICE 2,226,047

REAR AXLE DRIVE AND SUSPENSION MEANS

Carl Borgward, Bremen, Germany

Application August 3, 1939, Serial No. 288,216
In Germany May 14, 1938

7 Claims. (Cl. 180—73)

This invention relates to a rear wheel drive with Cardan shafts, in which the wheels are connected by a rigid axle and the rigid axle is guided perpendicularly relative to the chassis. The rigid rear axle connecting the rear wheels in itself presents the advantage, when the differential gear casing is separately secured on the vehicle chassis, that the masses which are not resiliently supported are very slight.

As compared with known constructions, the invention consists in that the rigid axle is guided at both ends by links located in known manner below and above the axle, in proximity to the wheel and extending in the longitudinal direction of the vehicle, and that one of the links taking up the lateral thrust is oscillatably mounted on the chassis by means of a transverse pin.

Whereas in known constructions and guiding arrangements of the rigid axle the axle is supported in the middle of the vehicle, the wheels connected by the rigid axle in the new construction are jointly held against lateral thrust by the links mounted near the wheels and engaging by means of transverse pins and furthermore the rigid axle while taking up the braking and torsional moments is at the same time secured against swinging by the links located below the axle.

In the case of braking, the springs are not loaded and the braking effect is taken up in a favorable manner in the longitudinal direction of the vehicle. In particular all shocks which occur on the wheel are taken up directly in proximity to the wheel.

Another feature of the invention consists in that the links taking up the lateral thrust are elastically connected to the rigid axle so as to allow a certain amount of play, the lateral movement being, however, limited by abutments.

By the yieldable mounting of the upper links in particular all laterally acting forces are taken up elastically and the movements caused by vibrations are favourably taken up without the chassis being affected. The rigid axle and consequently the wheels are thus guided as softly as possible. All danger of fracture is counter-acted.

The special type of spring suspension is also novel.

The invention can be carried into effect in various ways. Several forms of construction are illustrated by way of example in the accompanying drawings, in which:

Fig. 1 shows the rear wheel drive in side elevation,

Fig. 2 is a top plan view of one side of the drive,

Fig. 3 is a cross-section on a larger scale through the engaging bearing between a link and a wheel, Fig. 4 is an enlarged cross-section on line IV—IV of Fig. 2, Fig. 5 is a side elevation showing a modified form of the connection between the supporting stays and the links.

Fig. 6 is a top plan view showing another form of construction of the link bearing, Fig. 7 is a side elevation of another form of construction of the link bearing, Fig. 8 is a rear elevation on a larger scale of the rigid axle viewed from section line VIII—VIII of Fig. 7, Fig. 9 shows in horizontal longitudinal section the upper links according to Fig. 7 with their mounting in the tubular cross member of the chassis, Fig. 10 is a top plan view of another form of construction, Fig. 11 is a sectional view showing a form of construction of a link, Fig. 12 is a top plan view of yet another form of construction.

The wheels 1, 2 are driven by the differential gear 5 through the intermediary of Cardan shafts 3, 4, the differential gear being mounted on the chassis 7 preferably on rubber cushions 6. The wheels 1, 2 are connected by a rigid rear axle 8 which is rearwardly cranked and located behind the casing of the differential gear 5. The rigid axle 8 is further held by links 10 engaging a cross piece 9 as at 13 and arranged in the longitudinal direction of the vehicle under the axle. These links are oscillatably connected for example to cross members 11 at 12. It is advisable to use ball joints for the connections 12, 13. The rear wheels 1, 2 are further held against lateral thrust by links 14 likewise engaging the cross piece 9 laterally as at 18. The links 10 located laterally near the wheels in front of the axle, as shown in Fig. 1, are mounted under the wheel axle or under the Cardan shafts, whereas the links 14 above the axle are mounted behind the axle 8 and the Cardan shafts 3, 4 in a cross tube 15 of the chassis frame 7 by means of a cross pin 16. The upper links 14 may, however, project forwardly and form a link quadrilateral with the lower links 10.

The upper links 14 are also mounted in rubber 17 at their points of engagement on the rigid axle 8, as shown for example in Fig. 3. The links 14 engage for example on the pins 18 of the cross piece 9 connected to the rear axle with interposed rubber rings or rubber pads 17.

Furthermore, as Fig. 3 shows, lateral abutments 19 are provided for limiting the lateral movements of the links 14 carried in rubber. For this purpose the link hub may carry rubber cushions 20 which bear against the abutment 19 on the bolt 18.

From Fig. 3 it can also be seen that the rubber bearings 17 of the links are clamped under initial tension with the result that the tilting of the vehicle body is rendered difficult. The initial tension has the effect of preventing the wheels from forcing outwards.

The spring suspension of the axle may be effected either by means of blade springs, helical spring, torsional or twisting rod springs. In the drawings a twisting rod spring is shown by way of example as spring suspension.

The twisting rod springs 21 may be arranged directly on the pivot axles 16 of the links 14. The twisting rod springs 21 are at the same time mounted within the tubular cross member 15. The links 14 carry also shock absorbers 23, the links, as shown in Figs. 2 and 4, being mounted with the bearing sleeves 22 in bearing hubs 24 of the cross member 15.

The shock absorbers 23 may also act through the intermediary of lever arms 25 resting directly on the bearing sleeves 22 of the links 14.

Fig. 5 shows that the points at which the links 10 and 14 are articulated may lie superposed in one plane with the rigid axle 8 so that their points of engagement act in the same plane relative to the wheel in the event of lateral thrust.

Fig. 6 shows, that the link sleeves 22 may be mounted relatively displaced the one to the other on the tubular cross member 15, and at the same time the links 14 are each resiliently supported by separate twisting rod springs 21, 21a.

In the form of construction illustrated in Figs. 7 to 9 arms 27, 28 are formed of thin sheet metal on the rigid axle 8, these arms being connected by bolts 29. Bearing cones 30 are fitted between these arms 27, 28, and between these cones 30 and the bearing hubs 31 of the links 14, two rubber cones 32 are arranged each of which becomes thicker towards its outer end, as shown in Fig. 9.

The links 14 may consist for example of two pressed cup halves and carry at their rear end the bearing sleeve 16 which is mounted in the tubular cross member 15 and is there supported by two conical rubber rings 34 bearing against conical surfaces 33 of the sleeve.

The bearing sleeves 16 of the upper links 14 are connected to the twisting rod spring 29 which is arranged in the tubular cross member 15. The bearings 12, 13 of the lower links 10 and the downwardly directed arms 35 of the rigid axle 8 may be constructed in a similar manner to the upper engaging bearings of the links 14, that is they may be equipped with rubber cushions at the front or at the rear or both at the front and rear.

Fig. 10 shows that the spring suspension acts through the intermediary of the links 10 extending in forward direction under the rigid axle, in that the lower links are spring supported by means of twisting rod springs which engage the transverse pins 37 of the links 10.

The lateral guiding is effected as in the other forms of construction by the upper links 14.

The lower links 10 are supported on the rigid axle 8 in rubber cushions 38. Furthermore these lower links 10 are elastically guided in transverse direction and, for example may be formed by a blade spring 39 stood on edge (see Fig. 11).

Fig. 10 also shows that the upper links 14 may be elastically connected by a twisting rod spring 40 acting as stabiliser. This rod may be connected to shock absorbers as in the example illustrated in Figs. 1 to 4.

Fig. 12 shows, that the upper and lower links 10, 14 on each side of the vehicle may be resiliently connected by a twisting rod spring 21, 36.

The use of upper links also presents the advantage that, by arranging the points of engagement in proximity to the centre of gravity, a lateral outward tilting of the vehicle body in negotiating curves is avoided. It is even possible, to produce a vehicle which leans over inwards in the curves, if the connecting pins are located above the centre of gravity of the masses.

I claim:

1. A rear axle drive, comprising in combination a chassis, two rear wheels, a rigid axle connecting said rear wheels, Cardan shafts adapted to drive said wheels, two pairs of links adapted to guide said rigid axle relative to said chassis, one pair of links arranged near each wheel and one link of each pair extending in the longitudinal direction of the vehicle above and the other link of each pair below said rigid axle, and transverse pins mounted on said chassis and each oscillatably connecting a corresponding link of each pair to said chassis, the upper link of each pair being oscillatably connected to the chassis, rubber cushions supporting said upper links on the rigid axle, and abutments adapted to limit the lateral movements of said upper links.

2. A rear axle drive, comprising in combination a chassis, two rear wheels, a rigid axle connecting said rear wheels, Cardan shafts adapted to drive said wheels, two pairs of links adapted to guide said rigid axle relative to said chassis, one pair of links arranged near each wheel and one link of each pair extending in the longitudinal direction of the vehicle above and the other link of each pair below said rigid axle, and transverse pins mounted on said chassis and each oscillatably connecting a corresponding link of each pair to said chassis, the upper link of each pair being oscillatably connected to the chassis, rubber cushions supporting said upper links on the rigid axle, a bearing sleeve on the chassis and rubber cushioning means supporting the rear ends of said upper links on said sleeve.

3. A rear axle drive, comprising in combination a chassis, two rear wheels, a rigid axle connecting said rear wheels, Cardan shafts adapted to drive said wheels, two pairs of links adapted to guide said rigid axle relative to said chassis, one pair of links arranged near each wheel and one link of each pair extending in the longitudinal direction of the vehicle above and the other link of each pair below said rigid axle, and transverse pins mounted on said chassis and each oscillatably connecting a corresponding link of each pair to said chassis, the upper link of each pair being oscillatably connected to the chassis, two pairs of rubber cushions, each cushion becoming thicker towards its outer end and each pair supporting one of said upper links on the rigid axle, and abutments adapted to limit the lateral movements of said upper links.

4. A rear axle drive, comprising in combination a chassis, two rear wheels, a rigid axle connecting said rear wheels, Cardan shafts adapted to drive said wheels, two pairs of links adapted to guide said rigid axle relative to said chassis, one pair of links arranged near each wheel and one link of each pair extending in the longitudinal direction of the vehicle above and the other link of each pair below said rigid axle, and transverse pins mounted on said chassis and each oscillatably connecting a corresponding link of each pair to said chassis, the chassis having a tubular cross member, a bearing sleeve supporting the rear end of each of the upper links, and two conical rubber rings supporting the ends of said sleeves in said tubular cross member.

5. A rear axle drive, comprising in combination a chassis, two rear wheels, a rigid axle connecting said rear wheels, Cardan shafts adapted to drive said wheels, two pairs of links adapted to guide said rigid axle relative to said chassis, one pair of links arranged near each wheel and one link of each pair extending in the longitudinal direction of the vehicle above and the other link of each pair below said rigid axle, and transverse pins mounted on said chassis and each oscillatably connecting a corresponding link of each pair to said chassis, a tubular cross member on the chassis, twisting rod springs in said tubular cross member and each resiliently supporting one of the lower links, and a twisting rod spring acting as compensating spring connecting the two upper links.

6. A rear axle drive, comprising in combination a chassis, two rear wheels, a rigid axle connecting said rear wheels, Cardan shafts adapted to drive said wheels, two pairs of links adapted to guide said rigid axle relative to said chassis, one pair of links arranged near each wheel and one link of each pair extending in the longitudinal direction of the vehicle above and the other link of each pair below said rigid axle, and transverse pins mounted on said chassis and each oscillatably connecting a corresponding link of each pair to said chassis, tubular cross members on the chassis, and twisting rod springs arranged in said tubular cross members, each upper and lower link on each side of the vehicle being supported by one of said springs.

7. In a rear axle drive for a vehicle, including a frame, drive wheels for said frame, a rigid axle connecting said wheels, Cardan shafts driving said wheels, and links for guiding said rigid axle for movement vertically of said frame; said links being arranged parallel to the longitudinal axis of said vehicle and lying in planes above and below that of said axle, means mounting said links individually on said frame, said links engaging said axle adjacent said wheels on either side of said frame, said mounting means for said links including bearings comprising universal joints connecting a like end of each of said lower links to said frame, a bearing sleeve formed on like ends of said upper links, a tubular member carried by said frame and rotatably receiving said bearing sleeves therein, and elastic means connecting the opposite ends of said upper links to said axle.

CARL BORGWARD.